(12) United States Patent  (10) Patent No.: US 8,142,945 B2
An et al.  (45) Date of Patent: Mar. 27, 2012

(54) METHOD FOR CONTROLLING PERIPHERAL SYSTEM AND FUEL CELL SYSTEM USING THE SAME

(75) Inventors: Jin Hong An, Yongin (KR); Hyun Kim, Yongin (KR); Ri A Ju, Yongin (KR); Dong Rak Kim, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1050 days.

(21) Appl. No.: 11/585,755

(22) Filed: Oct. 23, 2006

(65) Prior Publication Data

US 2007/0104984 A1 May 10, 2007

(30) Foreign Application Priority Data

Nov. 10, 2005 (KR) .......................... 10-2005-107748

(51) Int. Cl.
*H01M 8/06* (2006.01)
*H01M 8/04* (2006.01)

(52) U.S. Cl. ........ 429/429; 429/413; 429/414; 429/415; 429/416; 429/423; 429/434

(58) Field of Classification Search ............... 429/22
See application file for complete search history.

(56) References Cited

U.S. PATENT DOCUMENTS

| 6,811,905 | B1 | 11/2004 | Cropley et al. | |
| 2002/0106537 | A1* | 8/2002 | Saito | 429/13 |
| 2004/0247962 | A1 | 12/2004 | Toukura | |
| 2006/0083966 | A1* | 4/2006 | Ozeki | 429/22 |
| 2007/0072023 | A1* | 3/2007 | Nakamura et al. | 429/22 |

FOREIGN PATENT DOCUMENTS

| EP | 1 414 091 A2 | 4/2004 |
| JP | 64-059777 | 3/1989 |
| JP | 05258760 A * | 10/1993 |
| JP | 2003-168464 | 6/2003 |
| JP | 2004-146118 | 5/2004 |
| JP | 2004-296135 | 10/2004 |
| JP | 2005-100886 | 4/2005 |
| JP | 2005-222823 | 8/2005 |
| JP | 2005-259656 | 9/2005 |
| JP | 2005-293894 | 10/2005 |

(Continued)

OTHER PUBLICATIONS

Nakamura et al., Machine translation of JP 2005294065 A, Oct. 2005, JPO.*

(Continued)

*Primary Examiner* — Basia Ridley
*Assistant Examiner* — Sean P Cullen
(74) *Attorney, Agent, or Firm* — Christie, Parker & Hale, LLP

(57) ABSTRACT

A method for controlling a peripheral system (or a plurality of peripheral devices) and a fuel cell system using the same. The method includes: allocating an operation priority to the peripheral devices; storing information of the operation priority; and sequentially operating the peripheral devices by using electric energy stored in a small capacity electricity storage device according to the operation priority. The fuel cell system includes: the plurality of peripheral devices; an electricity storage device electrically connected with the peripheral devices; and a controller for sequentially operating the peripheral devices by using electric energy stored in the electricity storage device according to an operation priority.

13 Claims, 6 Drawing Sheets

FOREIGN PATENT DOCUMENTS

| | | | |
|---|---|---|---|
| JP | 2005294065 A | * | 10/2005 |
| WO | WO 02/49138 A2 | | 6/2002 |
| WO | WO 2005/099007 A1 | | 10/2005 |

OTHER PUBLICATIONS

Machine translation of JP 2003168464 A, Kazama, Jun. 2003.*

Shimizu et al., Machine translation of JP 05258760 A, Oct. 1993.*

Patent Abstract of Japan No. 2004-146118, Published on May 20, 2004, in the name of Karaki Toshiro, et al.

European Search Report dated May 4, 2007, for EP 06123500.8, in the name of Samsung SDI Co., Ltd.

Japanese Office action dated Mar. 9, 2010, for corresponding Japanese Patent application 2006-256423, noting listed references in this IDS.

* cited by examiner

METHOD FOR CONTROLLING PERIPHERAL SYSTEM AND FUEL CELL SYSTEM USING THE SAME

CROSS-REFERENCE TO RELATED APPLICATION

This application claims priority to and the benefit of Korean Patent Application No. 10-2005-0107748, filed on Nov. 10, 2005, in the Korean Intellectual Property Office, the entire content of which is incorporated herein by reference.

BACKGROUND

1. Field of the Invention

The present invention relates to a fuel cell system, and more particularly, to a method for controlling peripheral system of a fuel cell and a fuel cell system using the same, wherein unexpected damages and adverse effects on lifetime and safety of an electricity storage device can be reduced (or minimized or prevented) by sequentially starting several peripheral devices for operating the fuel cell.

2. Discussion of Related Art

A fuel cell is a power generation system that directly converts chemical reaction energy into electric energy through an electrochemical reaction between hydrogen (or fuel) and oxygen (or oxidizing agent or oxidant).

According to the type of electrolyte used, the fuel cells can be categorized as a phosphoric acid fuel cell, a molten carbonate fuel cell, a solid oxide fuel cell, a polymer electrolyte membrane fuel cell, an alkaline fuel cell, etc. These respective fuel cells are operated based on the same basic principle, but are different in the type of fuels used, operation temperatures, catalysts, electrolytes, etc.

As compared with other fuel cells, the polymer electrolyte membrane fuel cell (PEMFC) has relatively high output characteristic, a low operation temperature characteristic, and a rapid starting and responding characteristic. As such, the PEMFC is widely applicable as a mobile power source for a portable electronic equipment or a transportable power source for an automobile, as well as a distributed power source such as a stationary power plant for a house, a public building, etc. Also, a direct methanol fuel cell (DMFC) is similar to the PEMFC described above and can be considered as a type of PEMFC, but the DMFC can directly use a liquid methanol fuel. As such, since the DMFC does not need to use a reformer, the DMFC can be made smaller in size than the PEMFC needing a reformer.

A conventional PEMFC (or DMFC) system Includes a fuel tank for storing fuel, a fuel pump for transporting fuel, an air pump for compressing and transporting air, a controller for controlling a system, and a stack of unit cells. The stack (or fuel cell stack or fuel cell) has several tens to several hundreds of unit cells stacked adjacent to one another. A unit cell is composed of a membrane-electrode assembly (MEA) and a separator stacked on either side of the MEA. Herein, the membrane-electrode assembly has an anode electrode (also referred to as "fuel electrode" or "oxidation electrode") and a cathode electrode (also referred to as "air electrode" or "reduction electrode") that are adhered with each other with a polymer electrolyte membrane therebetween. The separator includes a flow channel for supplying a fuel (e.g., hydrogen) or an oxidizing agent (e.g., oxygen) and also function as a conductor to electrically connect a plurality of membrane electrode assemblies (MEAs) in series. In a system of the aforementioned construction, if a liquid fuel such as methanol aqueous solution or gas fuel such as hydrogen gas (or hydrogen-rich gas) is supplied to an anode of the stack, and an oxidizing agent such as oxygen gas, air in the atmosphere, etc., is supplied to a cathode, the stack generates electricity and heat by electrochemically reacting the fuel with the oxidizing agent.

Also, the conventional fuel cell system includes an electricity storage device having a controller for controlling a charge/discharge thereof, such as a secondary battery, a super capacitor, etc. When the fuel cell system starts, the electricity storage device supplies electric energy to the peripheral devices of the fuel cell such as the fuel pump, the air pump, fan, etc., or when a load demands excessive electric power, the electricity storage device supplies charged electric energy instead of energy from the fuel cell (or the stack of the fuel cell system) to the load. As such, the fuel cell system including the electricity storage device is capable of extending the time of use and optimizing the system response characteristics.

However, in the conventional fuel cell system, the electricity storage device is selected to smoothly supply starting electric power to the various peripheral devices of the fuel cell system installed for improving the operation efficiency of the system and to have sufficient capacity in order to meet the demanding power of the load when the load demands excessive electric power. In this case, as the weight and volume of the electricity storage device are increased, the weight and volume of the fuel cell system are also increased.

Also, the capacity of the electricity storage device is designed to be relatively large. That is, since the electricity storage device may be damaged by the maximum instantaneous electric power (i.e., instant peak electric power consumed in the peripheral devices when the fuel cell system starts), a relatively large electricity storage device is used to sustain (or account for) the instant peak electric power of the peripheral devices. However, in spite of this, the electricity storage device, such as a secondary battery, can still be (and/or is often) damaged by the instant peak electric power.

Furthermore, in the case of the fuel cell system using a secondary battery, when the remaining capacity of the secondary battery is small or the time required for starting is extended at the time of starting, over-discharge of the secondary battery is caused, which can damage or break the secondary battery. Therefore, in the conventional fuel cell system, the secondary battery having a power capacity larger than is needed for a typical operation of the fuel cell system should be used.

As described above, in the conventional fuel cell systems, the electricity storage device, such as the secondary battery or the super capacitor, can be damaged to detrimentally affect its safety, when the peripheral devices of the fuel cell start. As such, there is a need for a fuel cell system to have a scheme that does not have an adverse effect on the lifetime and/or the safety of an electricity storage device of the fuel cell system.

SUMMARY OF THE INVENTION

Accordingly, it is an aspect of the present invention to provide a method for operating peripheral devices of a fuel cell capable of reducing (or minimizing or preventing) damage to an electricity storage device and adverse effects on lifetime and safety thereof, when starting the fuel cell system using the electricity storage device.

It is another aspect of the present invention to provide a fuel cell system using the above method for operating the peripheral devices of a fuel cell.

A first embodiment of the present invention provides a fuel cell system. The fuel cell system includes: a plurality of peripheral devices including an oxidant supplier for supplying an oxidizing agent to a fuel cell for generating electricity through an electrochemical reaction between a mixed fuel and the oxidizing agent, a fuel supplier for supplying a high concentration fuel to a mixing tank for storing water and un-reacted fuel recovered from a fluid exhausted from the fuel cell, and a fuel feeder for feeding the mixed fuel stored in the mixing tank to the fuel cell; an electricity storage device electrically connected with the peripheral devices; and a controller for sequentially operating the peripheral devices by using electric energy stored in the electricity storage device according to an operation priority (which may be preset).

A second embodiment of the present invention provides a fuel cell system. The fuel cell system includes: a peripheral system including a fuel supplier for supplying a fuel to a fuel cell for generating electricity through an electrochemical reaction between the fuel and an oxidizing agent; an electricity storage device for supplying electric energy to the peripheral system and having a power capacity smaller than a power capacity capable of sustaining an instant peak load generated when the entire peripheral system starts; and a controller for sequentially starting the peripheral system by using electric energy stored in the electricity storage device according to an operation priority (which may be preset).

A third embodiment of the present invention provides a method for controlling a plurality of peripheral devices for supplying a fuel and an oxidizing agent to a fuel cell and for providing an environment suitable for operating the fuel cell. The method includes: allocating an operation priority to the peripheral devices; storing information of the operation priority; and sequentially operating the peripheral devices by using electric energy stored in a small capacity electricity storage device according to the operation priority.

In one embodiment, the electricity storage device includes at least one of a battery or a super capacitor, and the small capacity electricity storage device is an electricity storage device having a power capacity smaller than a power capacity capable of sustaining an instant peak load when all of the peripheral devices are concurrently started. Here, the peripheral system includes the peripheral devices.

In one embodiment, the fuel cell includes a polymer electrolyte membrane fuel cell for using a hydrogen gas or a gas fuel including the hydrogen gas as a main component.

In one embodiment, the above method includes a step for sequentially operating a humidifier for hydrating electrolyte membrane in the fuel cell, a fuel supplier for supplying the fuel to the fuel cell, and an oxidant supplier for supplying the oxidizing agent to the fuel cell at a time interval in response to an inputted starting request signal.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

Figure 1:
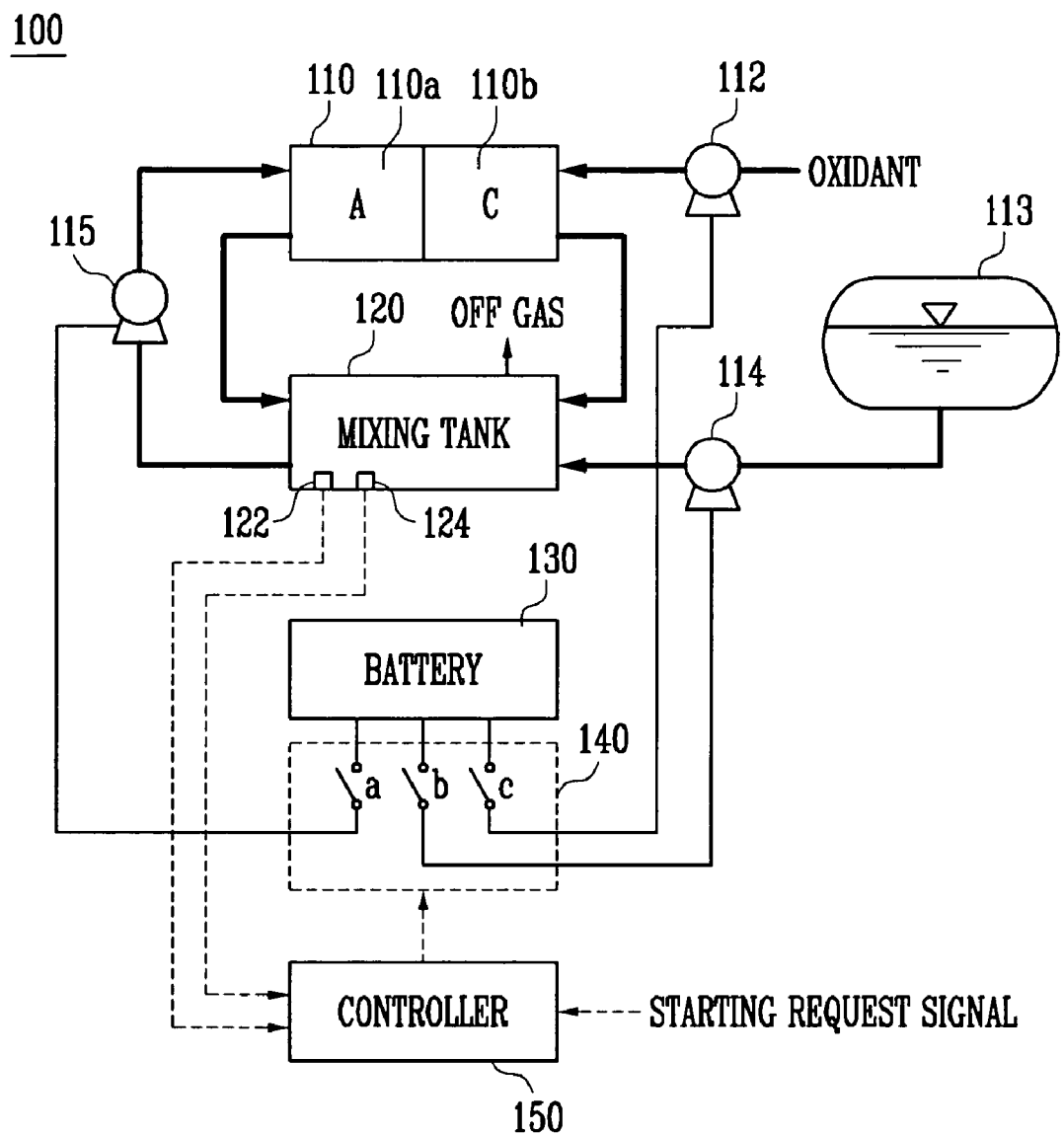
FIG. 1 is a block diagram showing a fuel cell system according to a first embodiment of the present invention.

FIG. 1 is a block diagram showing a fuel cell system according to a first embodiment of the present invention.

Referring to FIG. 1, a fuel cell system 100 includes a fuel cell (or a fuel cell stack) 110, an oxidant supplier 112, a fuel supplier 114 coupled with a fuel tank 113, a fuel feeder 115, a mixing tank 120, a battery (or secondary battery) 130, a switching portion 140, and a controller 150.

In more detail, the fuel cell 110 has a stack structure in which several tens to several hundreds of membrane-electrode assemblies (MEAs) are stacked adjacent to one another with a separator therebetween (i.e., between two MEAs). In the present invention, the fuel cell may have other suitable structures and is not limited to the above described stack structure. The fuel supplier 114 supplies a high concentration fuel, for example, a high concentration methanol aqueous solution, to the mixing tank 120; the fuel feeder 115 supplies a mixed fuel stored in the mixing tank 120 to an anode 110a of the fuel cell 110; and the oxidant supplier 112 supplies an oxidizing agent, for example, air, oxygen gas, etc., to the cathode 110b of the fuel cell 110. If the mixed fuel and the oxidizing agent are supplied to the fuel cell 110, the fuel cell 110 generates electricity and heat by an electrochemical reaction of the mixed fuel with the oxidizing agent. The mixing tank 120 recovers and stores a recovered fluid from the anode outlet stream and/or the cathode outlet stream exhausted from the fuel cell 110, for example, un-reacted fuel and water.

The battery 130 supplies electric energy to peripheral devices of the fuel cell supporting the fuel cell operation, such as the oxidant supplier 112, the fuel supplier 114 and the fuel feeder 115, as described above. Here, the capacity of the battery 130 is smaller than the capacity needed to sustain (or to meet) an instant peak generated when all the peripheral devices of the fuel cell start. The aforementioned battery 130 is described as an example of the electricity storage device controlled by the controller 150 for controlling charge/discharge, and in the present embodiments, the secondary battery 130 can be replaced with various electricity storage devices such as a super capacitor, etc., which can be reused by charging electric energy.

The switching portion 140 electrically and sequentially connects the secondary battery 130 to the peripheral devices of the fuel cell by a control of the controller 150. The switching portion 140 includes a plurality of switching contact points a, b, c for sequentially connecting the secondary battery 130 to respective peripheral devices of the fuel cell system 100. A separate device or a functioning portion of a portion of a controller 150 can implement the switching portion 140.

The controller 150 performs a routine (or scheme) for sequentially operating the peripheral devices of the fuel cell system 100 in response to the inputted starting request signal. The controller 150 includes mechanisms for sequentially operating the peripheral devices of the fuel cell. The mechanisms for sequentially operating the peripheral devices include information pre-stored in a memory or a logic circuit mounted in the controller 150 and implemented by a flip-flop. Also, the controller 150 uses a level sensor 122 for detecting a level of the mixed fuel stored in the mixing tank 120 and also uses information inputted from a concentration sensor 124 for detecting fuel concentration of the mixed fuel in order to efficiently and flexibly account for (or cope with) the various states of the fuel cell system. The level sensor 122 and the concentration sensor 124 can be implemented using various suitable sensors.

Figure 2:
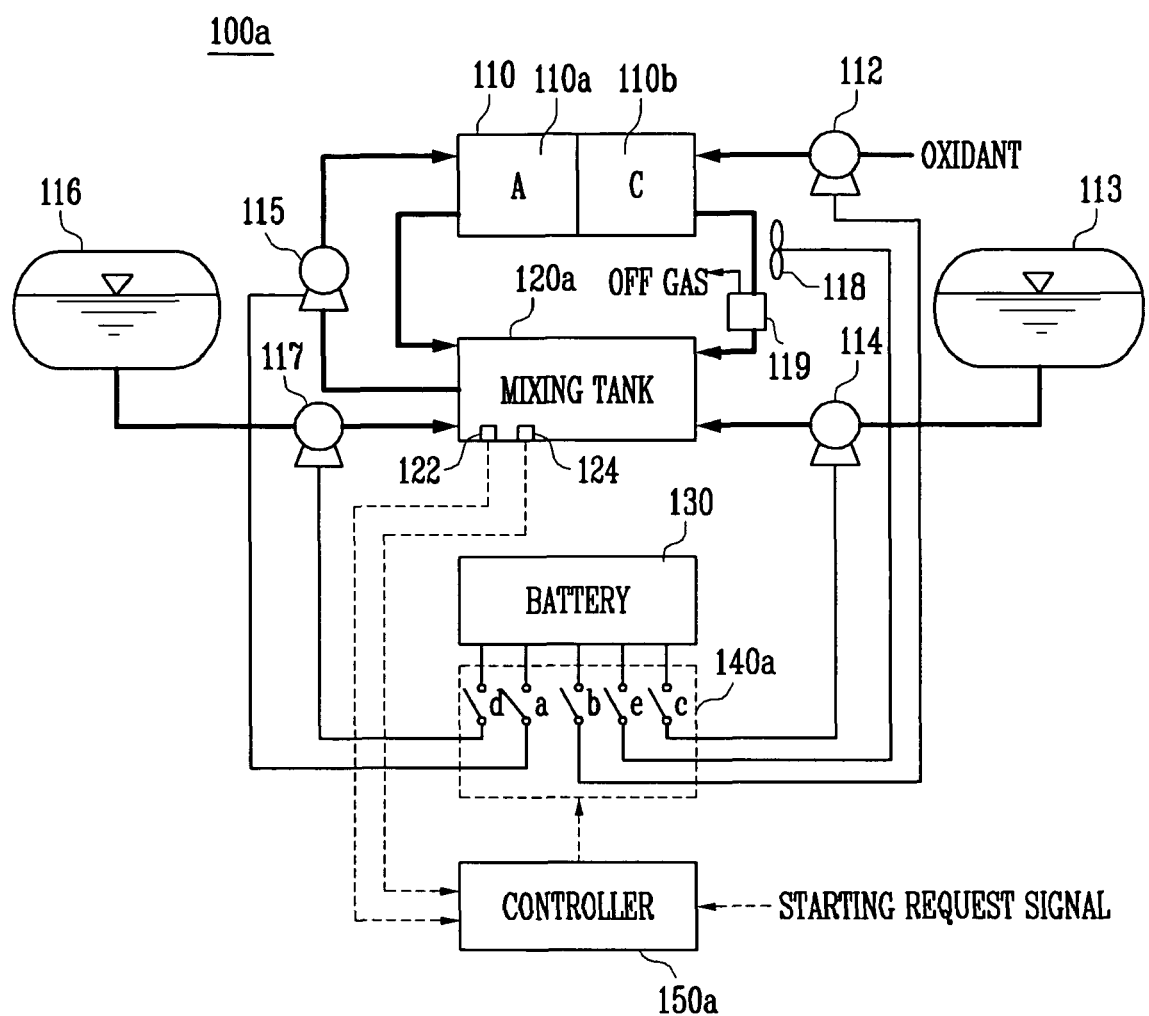
FIG. 2 is a block diagram showing a variation example of the fuel cell system according to the first embodiment of the present invention.

FIG. 2 is a block diagram showing a variation example of a fuel cell system according to the first embodiment of the present invention.

Referring to FIG. 2, a fuel cell system 100a includes a fuel cell 110, an oxidant supplier 112, a fuel supplier 114 coupled with a fuel tank 113, a fuel feeder 115, a water supplier 117 coupled with a water tank 116, a mixing tank 120a, a secondary battery 130, a switching portion 140a, and a controller 150a.

The fuel cell system 100a of FIG. 2 is substantially the same as the foregoing fuel cell system 100 of FIG. 1, but is constructed to further include several additional peripheral devices (or components). Also, in the following description, the detailed description of the components that are identical or similar to the description of the aforementioned peripheral devices of the fuel cell system 100 will not be provided again in order to avoid duplication.

Describing the additional components more specifically, the water supplier 117 supplies water stored in the water tank 116 to the mixing tank 120a. In one embodiment, the water is pure water in order to reduce (or minimize or prevent) the adverse effects of the water on the electrolyte membrane or the electrode catalyst in the fuel cell 110, etc.

A heat exchanger 118 recovers heat from fluid exhausted from the fuel cell 110 and condenses the un-reacted fuel and water. The heat exchanger 118 can be implemented by a fan installed on a position (which may be predetermined) of a pipe connecting the anode 110a and/or the cathode 110b of the fuel cell 110 to the mixing tank 120a. In this case, some pipes adjacent to the fan may be exposed to the fan to increase their thermal conductivity and/or ventilation. Also, in one embodiment, the heat exchanger 118 is installed together with a trap 119 for condensing un-reacted fuel and water and for exhausting unwanted gas.

All the peripheral devices of the fuel cell system 100a including the aforementioned water supplier 117 and the heat exchanger 118 are controlled by the controller 150a. In particular, upon starting the fuel cell system 100a, the controller 150a controls the switching portion 140a to sequentially switch on its contact points, thereby sequentially supplying the electric energy stored in the secondary battery 130 to respective peripheral devices.

According to the aforementioned construction, the fuel cell system (e.g., 100 or 100a) is capable of reducing (minimizing or preventing) damage to the secondary battery by reducing the instant peak power required in the secondary cell when the fuel cell system starts, and is capable of reducing the over-discharge of the secondary battery (e.g., 130) even when the power capacity of the secondary battery is small.

Also, the fuel supplier, the fuel feeder, the oxidant supplier, and the water supplier, as described above, all include devices operating to perform the corresponding function by electric energy. For example, the devices include: a transporter for directly transporting fluid by generating a pressure (which may be predetermined), such as a pump, a ventilator, a blower, a fan, etc.; or a controller for controlling the supply of fluid by controlling an opening (or a size of an opening) of a transporting path of fluid transported by a separate pressure such as a power valve; etc.

FIG. 3A to FIG. 3D are flow diagrams showing a method for operating peripheral devices of a fuel cell according to the first embodiment of the present invention. In one embodiment of the present invention, the method for operating the peripheral devices of the fuel cell is applied to the aforementioned fuel cell system 100 or 100a.

Figure 3A:
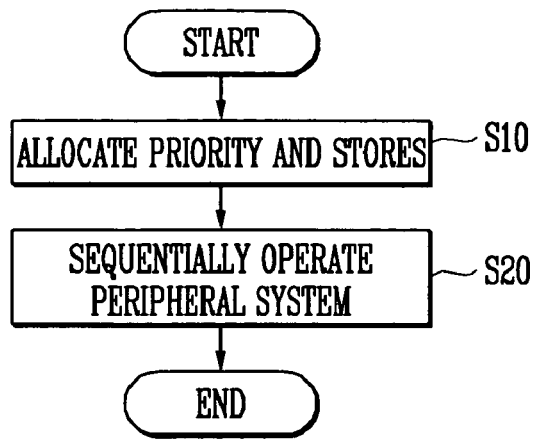
FIGS. 3A, 3B, 3C, and 3D are flow diagrams showing a method for operating peripheral devices of a fuel cell according to the first embodiment of the present invention.
Figure 3B:
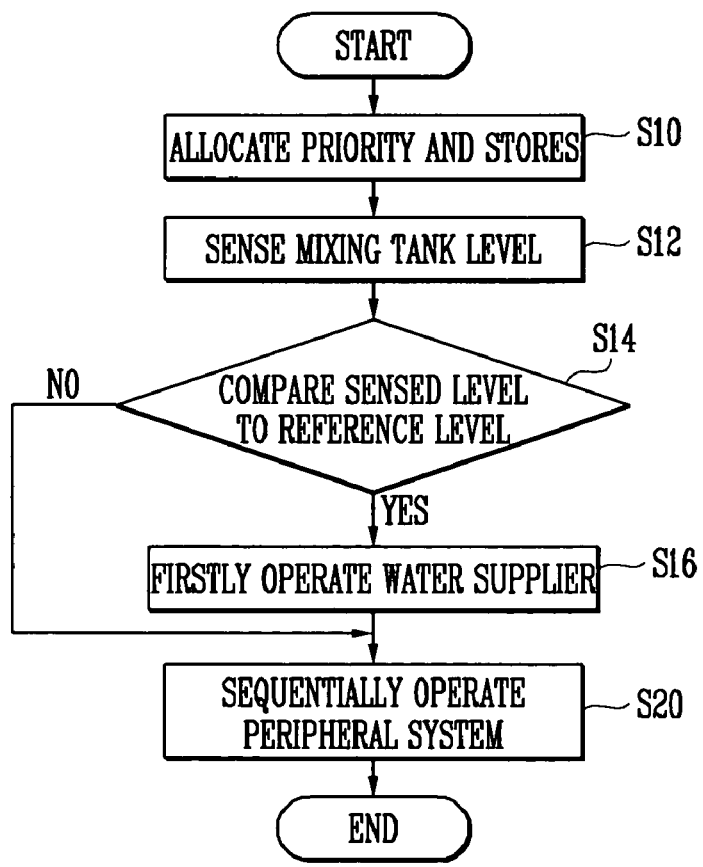

Referring to FIG. 3A, the method for operating the peripheral devices of the fuel cell allocates an operation priority to the peripheral devices of the fuel cell and stores information on the allocated operation priority (S10). Thereafter, the controller sequentially operates the peripheral devices of the fuel cell in response to the starting request signal when the system starts (S20). The peripheral devices of the fuel cell are sequentially started up according to the operation priority.

The electricity storage device mounted on the fuel cell system using the aforementioned operating method has a power capacity, which is set to be able to sustain (or meet) an instant peak load, smaller than the power capacity of the electricity storage device mounted on a conventional fuel cell system. Therefore, according to the present invention, the electricity storage device can be made smaller in size than the conventional electricity storage device so that the full cell system can be miniaturized and/or be made to be lightweight.

The aforementioned method for operating the peripheral devices of the fuel cell can be constructed in order to flexibly cope with the various states of the fuel cell system. That is, in one embodiment and referring to FIG. 3B, the method for operating the peripheral devices of the fuel cell system allocates the operation priority to the peripheral devices of the fuel cell and stores the information on the allocated operation priority (S10). Thereafter, if the starting request signal is inputted to the controller of the fuel cell system, the controller senses the level of the mixed fuel stored in the mixing tank in response to the starting request signal (S12).

Next, the controller determines (or judges) whether the sensed level is below a reference level (S14). The reference level can refer to a level when the fuel and/or the water are (or need to be) supplemented due to the lack of the mixed fuel stored in the mixing tank. Therefore, the controller can first operate the water supplier for supplying water to the mixing tank (S16). Then, the controller can sequentially operate the other peripheral devices of the fuel cell according to the pre-stored operation priority (S20).

Figure 3C:
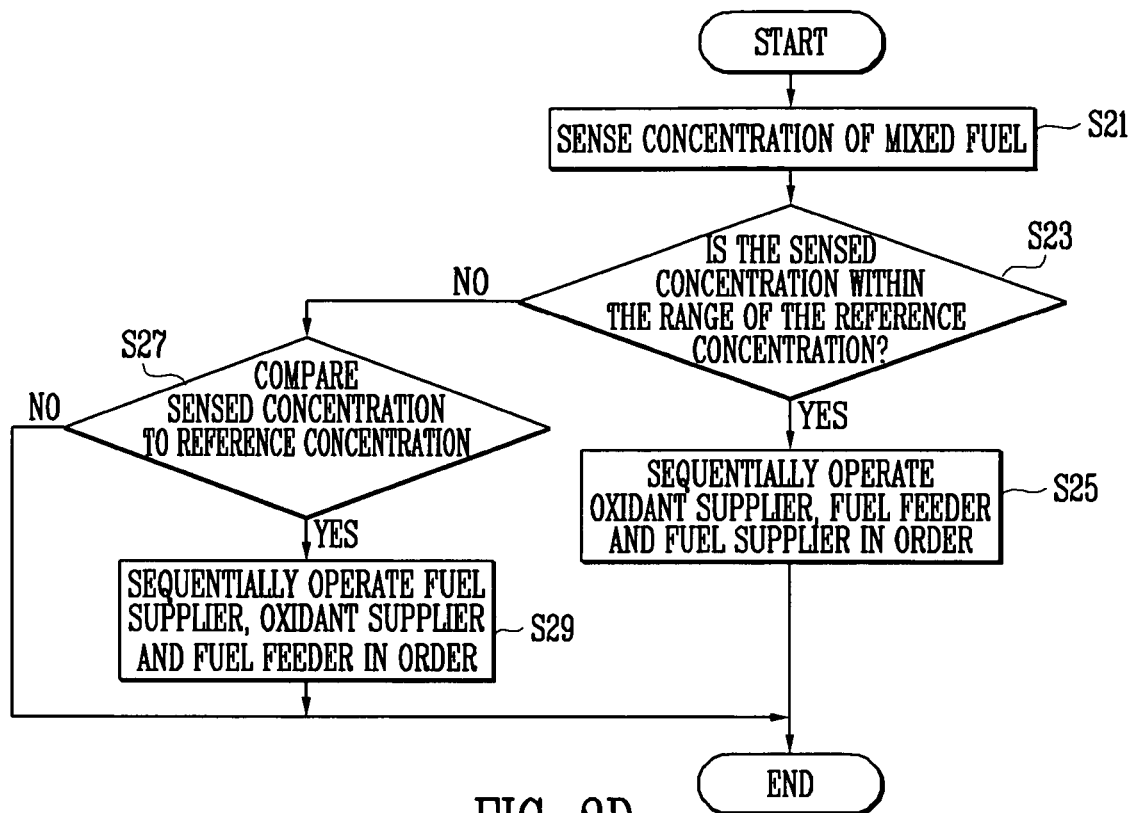

Also, the method for operating the peripheral devices of the fuel cell may include the following processes for sequentially operating the peripheral devices of the fuel cell. Referring to FIG. 3C, the controller first senses the concentration of the mixed fuel (S21). Next, the controller determines (or judges) whether the sensed concentration is within the reference concentration (S23). The reference concentration properly selects the concentration of the mixed fuel in consideration of the characteristics of the fuel cell (or the stack) that influence the ability and/or function of the fuel cell system such as a crossover of fuel, etc. In case of methanol aqueous solution, the methanol aqueous solution is selected to have a range from 0.5 to 6 moles according to the characteristics of the electrolyte membrane.

As a result of the above determination (or judgment), if the sensed concentration is within the range of the reference concentration, the controller sequentially operates each peripheral device in order of the oxidant supplier, the fuel feeder, and the fuel supplier (S25).

The reason for operating the oxidant supplier first in the above step (S25) is that the power capacity required for operating the oxidant supplier (or the power needed to run the oxidant supplier) is usually greater than the fuel feeder or the fuel supplier. In other words, if the oxidant supplier is operated before operating the other peripheral devices, a burden (or load) on the electricity storage device such as the secondary battery can be reduced. The reason for operating the fuel feeder following the oxidant supplier is to rapidly operate the fuel cell system. The fuel supplier starts after a sequential starting of the oxidant supplier and the fuel feeder to supply a high concentration fuel to the mixing tank so that the concentration of the mixed fuel can be maintained to the desired concentration.

As a result of the above determination (or judgment), if the sensed concentration is not within the range of the reference concentration, the controller judges whether the sensed concentration is below the reference concentration (S27). As a result of this determination (or judgment), if the sensed concentration is below the reference concentration, the controller sequentially operates each peripheral device of fuel cell system in order of the fuel feeder, the oxidant supplier, and the fuel supplier (S29).

The reason for operating the fuel supplier first in the step (S29) is to raise the concentration of the mixed fuel to a desired concentration, because the concentration of the mixed fuel supplied to the fuel cell is low. The reason for operating the oxidant supplier and the fuel feeder in the order described is that the power capacity needed to operate the oxidant supplier for supplying air to the fuel cell as the oxidizing agent is usually greater than the power capacity needed to operate the fuel feeder for supplying the mixed fuel to the fuel cell, as described above.

Also, as a result of the above determination (or judgment), if the sensed concentration is not lower than the reference concentration, the present operating process is terminated. In the case when a direct methanol fuel cell is used, an increase of the concentration of the mixed fuel rarely occurs, and it is therefore designed not to perform a separate process for sensing concentration. However, in case that the sensed concentration is higher than the reference concentration, that is, in case that the sensed concentration exceeds the range of the reference concentration, the controller can be designed to generate a system alarm and/or to operate the water supplier first.

Figure 3D:
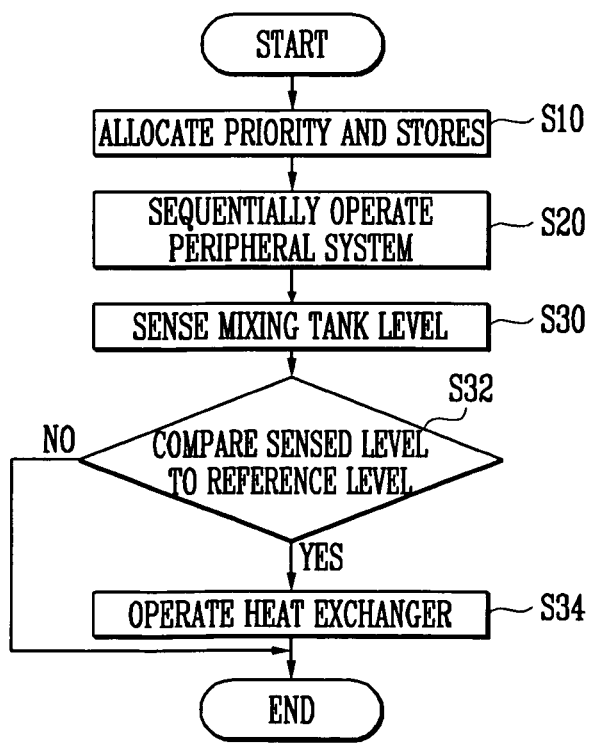

The aforementioned method for operating the peripheral devices of the fuel cell can further include the processes as shown in FIG. 3D, in case that the starting time is extended and the level of the mixed fuel is reduced.

Referring to FIG. 3D, as described above, the controller sequentially operates the peripheral devices of the fuel cell according to the preset operation priority, and thereafter senses the level of the mixed fuel for monitoring the level state of the mixed fuel (S30). The controller determines (or judges) whether the sensed level is below a reference level (S32).

As a result of the above determination (or judgment), if the level of the sensed mixed fuel is lower than the reference level, the controller further operates the heat exchanger (S34). The heat exchanger takes heat energy of the high temperature fluid and condenses the un-reacted fuel and steam in the gas state included in the fluid into a liquid fuel and water so that un-reacted fuel and steam exhausted from the fuel cell can flow well into the mixing tank. As a result of the above determination (or judgment), if the level of the sensed mixed fuel is not low, the present operating process is designed to be terminated in the state that the operation of the heat exchanger stops, assuming that it is within the range of the reference level.

Also, the level of the mixed fuel in most direct methanol fuel cell systems is reduced when the system operates, and a case where the level of the mixed fuel exceeds the range of the reference level will not be described. However, in case where the level of the mixed fuel exceeds the range of the reference level, in the present embodiment, for example, the controller can be designed to generate a system alarm.

As described above, the method for operating the peripheral devices of the fuel cell system can sequentially operate other peripheral devices as well as the heat exchanger according to the various states of the fuel cell system when starting, thereby enhancing the safety of the electricity storage device and improving the reliability of the fuel cell system.

Figure 4:
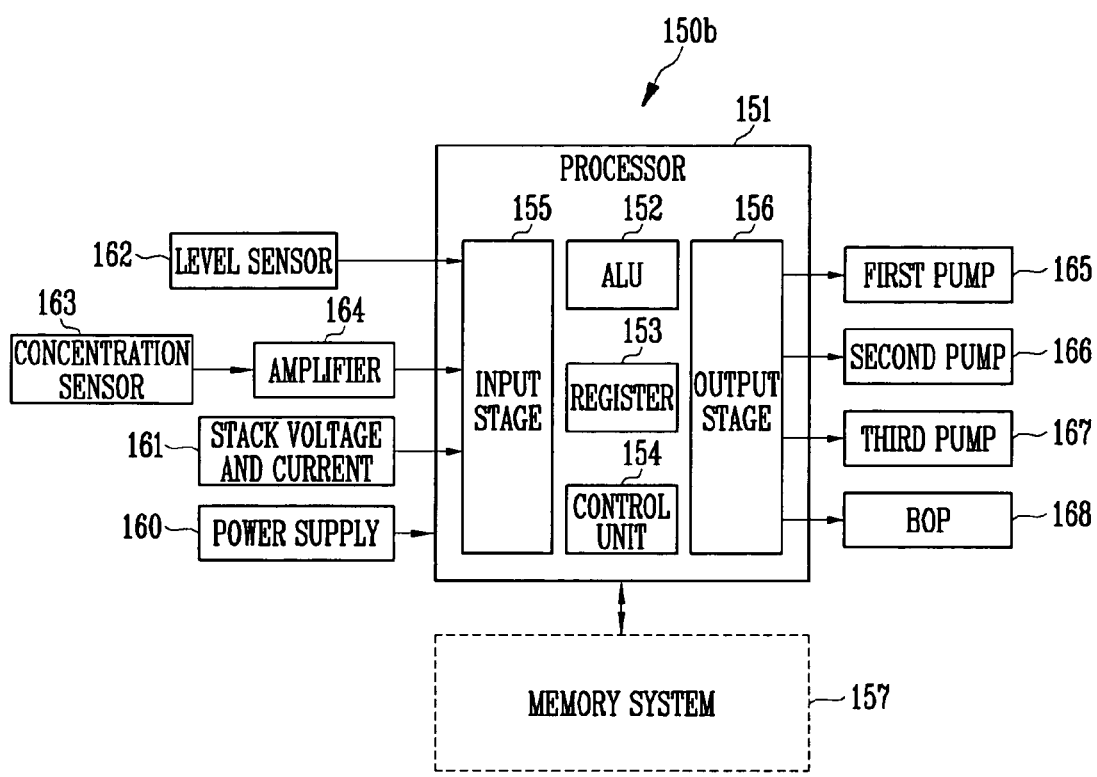
FIG. 4 is a block diagram showing a controller available to the fuel cell system according to the first embodiment of the present invention.

FIG. 4 is a block diagram showing a controller that can be used by (or adapted into) the fuel cell system according to the first embodiment of the present invention.

Referring to FIG. 4, a controller 150b controls the entire operation of a fuel cell system. For this, the controller 150b includes a memory system 157 for storing a program to control several components of the fuel cell system, and a processor 151 coupled with the memory system 157 for running (or operating) the program.

More specifically, the processor 151 includes an arithmetic logic unit (ALU) 152 for performing a calculation, a register 153 for temporarily storing data or commands, and a control unit 154 for controlling the operation of the system. The processor 151 includes one or more processors having various architectures, such as Alpha of Digital Company; MIPS of MIPS Technology, NEC, IDT, Siemens, etc.; x86 of Intel, Cyrix, AMD and Nexgen; and PowerPC of Motorola.

Also, the processor 151 includes an input stage 155 and an output stage 156. The input stage 155 can be implemented by an analog-to-digital converter with a number of bits (or a predetermined number of bits). The output stage 156 can be implemented by a digital-to-analog converter and/or an output buffer for outputting a control signal in the form of a signal suitable for controlling each component in the fuel cell system, for receiving a signal outputted from the control unit 154, and for transmitting the received signal to the corresponding device.

The controller 150b having the aforementioned construction receives power from the fuel cell system or a separate power supplier 160, senses output voltage and current of the fuel cell system via a voltage and current measuring device 161, senses the level of the mixed fuel, etc., to be stored in the mixing tank via a level sensor 162, and senses an electric signal for the concentration of the mixed fuel detected in a concentration sensor 163 through an amplifier 164.

Also, the controller 150b controls, for example, a first pump 165 included in the oxidant supplier, a second pump 166 included in the fuel supplier, a third pump 167 included in the fuel feeder and other peripheral devices 168 (Balance-of-Plant: BOP) such as the heat exchanger, etc., and in particular, the controller 150b sequentially operates each peripheral device according to the operation priority stored in the memory system 157 when the system starts. In this case, the processor 151 can control each peripheral device controller (not shown) controlling each peripheral device 165, 166, 167, 168 or directly control peripheral devices such as a pump using frequency.

The memory system 157 includes a high speed memory in the form of a storage medium such as a random access memory (RAM), a read only memory (ROM), etc.; a sub-memory in the form of a long term storage medium such as a floppy disk, a hard disk, a magnetic tape, CD-ROM, a flash memory, etc.; and/or a device for storing data by using electric, magnetic, optical, and/or other storage medium.

Also, the memory system 157 stores information for an efficient sequential operating of the peripheral devices of the fuel cell when the system starts. In one embodiment and as described above with reference to FIG. 3A to FIG. 3B, this information is hierarchically subdivided and stored in order to flexibly respond according to the states of the fuel cell system. The memory system 157 also stores information on the reference concentration of the mixed fuel and the reference level of the mixed fuel.

Also, the method for operating the peripheral devices of the fuel cell according to the present invention is designed to be suitable for the direct methanol fuel cell system. However, the present invention can be applicable to other types of fuel cell systems such as a polymer electrolyte membrane fuel cell system.

Figure 5:
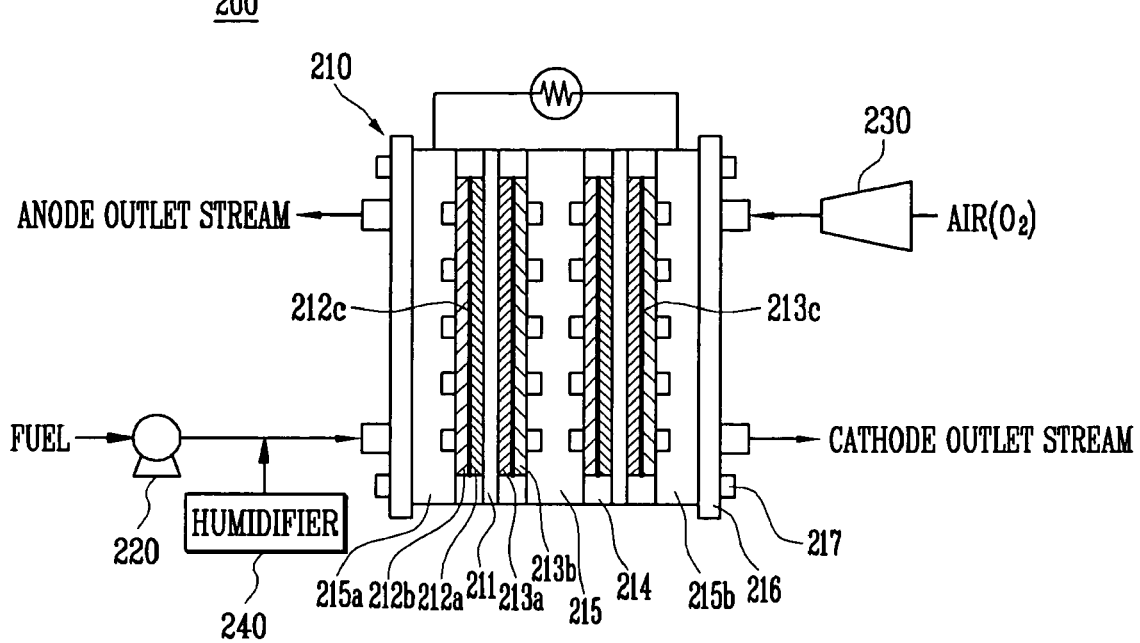
FIG. 5 is a diagram schematically showing a fuel cell system according to a second embodiment of the present invention.

FIG. 5 is a diagram schematically showing a fuel cell system according to a second embodiment of the present invention.

Referring to FIG. 5, a polymer electrolyte membrane fuel cell system 200 includes a fuel cell (or stack) 210 for generating electricity by an electrochemical reaction of a fuel with an oxidizing agent, a fuel supplier 220 for supplying the fuel to an anode of the fuel cell 210, an oxidant supplier 230 for supplying the oxidizing agent to a cathode of the fuel cell 210, a humidifier 240 for hydrating an electrolyte membrane 211 in the fuel cell 210, and a controller (not shown) for controlling the operations of the fuel supplier 220, the oxidant supplier 230, and the humidifier 240.

The polymer electrolyte membrane fuel cell system of FIG. 5 is designed in the manner such that the fuel cell 210 does not use reformed gas supplied by a separate reformer but directly uses fuel in the state of gas including hydrogen. Therefore, the fuel supplier 220 becomes a device capable of supplying hydrogen gas (or hydrogen-rich gas) and the fuel is the hydrogen gas. The controller here operates the fuel cell system 200 in a manner substantially the same as described for the first embodiment. That is, the controller sequentially operates each peripheral device such as the fuel supplier, the oxidant supplier, and the humidifier according to an operation priority when the system starts.

Describing the aforementioned polymer electrolyte membrane fuel cell system in more detail, the fuel cell 210 includes a membrane-electrode assembly (MEA) composed of a polymer electrolyte membrane 211 and anode electrodes 212a, 212b and cathode electrodes 213a, 213b respectively positioned on opposite sides of the electrolyte membrane 211, and separators 215, 215a, 215b connecting a plurality of the membrane-electrode assemblies in series and supplying the fuel and the oxidizing agent to the anode electrodes 212a, 212b, 212c and the cathode electrodes 213a, 213b, 213c respectively. Also, the fuel cell 210 includes a gasket 214 positioning between the electrolyte membrane 211 and the separators 215, 215a, 215b; a pair of end plates 216 for providing a engaging pressure (which may be predetermined) to the stacked structure of the membrane-electrode assemblies and the separators 215, 215a, 215b; and engagement mechanisms 217 for engaging (and/or joining) the pair of end plates 216.

In more detail, the membrane-electrode assembly generates electric energy by inducing an oxidation and reduction reaction of the fuel with the oxidizing agent. The anode electrode includes a catalyst layer 212a for converting the fuel into electrons and hydrogen ions, and a diffusing layer 212b for smoothly moving the fuel and carbon dioxide, and for moving the electrons. The cathode electrode includes a catalyst layer 213a for converting oxidizing agent, such as oxygen in the atmosphere into electrons and oxygen ions by a reduction reaction, and a diffusing layer 213b for smoothly moving air and for smoothly exhausting of generated water. The electrolyte membrane 211 is a solid polymer electrolyte with a thickness ranging from 50 to 200 μm and has an ion exchange function for moving the hydrogen ions generated in the catalyst layer 212a of the anode electrode to the catalyst layer 213a of the cathode electrode. In one embodiment, the diffusing layer 212b or 213b of the anode electrode or the cathode electrode includes a microporous layer 212c or 213c for distributing and supplying fuel or oxidizing agent toward the catalyst layer 212a or 213a, and the microporous layer 212c or 213c is coated on the surface of the diffusing layer 212b or 213b.

Describing each component more specifically, the electrolyte membrane 211 according to one embodiment includes at least one hydrogen ion conductive polymer selected from the group consisting of: perfluoro-based polymer, benzimidazole-based polymer, polyimide-based polymer, polyetherimide-based polymer, polyphenylensulfide-based polymer, polysulfone-based polymer, polyethersulfone-based polymer, polyetherketon-based polymer, polyether-etherketon-based polymer, polyphenylquinoxaline-based polymer, and combinations thereof. The selected hydrogen ion conductive polymer should have a high hydrogen ion conductivity. In one embodiment, the electrolyte membrane 211 includes at least one hydrogen ion conductive polymer selected from the group consisting of: copolymer of tetrafluoroethylne and fluorovinylether including poly (perfluorosulfonic acid), poly (perfluorocarbosylic acid) and sulfonic group, defluorinated polyetherketon sulfide, aryl keton, poly (2,2'-(m-phenylene)-5,5'-bibenzimidazole)(poly(2,2'-(m-phenylene)-5,5'-bibenzimidazole)) and poly (2,5'-benzimidazole), and combinations thereof.

In one embodiment, the catalyst layers 212a, 213a include at least one metal catalyst selected from the group consisting of: platinum, ruthenium, osmium, platinum-ruthenium alloy, platinum-osmium alloy, platinum-palladium alloy, platinum-M alloy (M is at least one transition metal selected from the group consisting of Ga, Ti, V, Cr, Mn, Fe, Co, Ni, Cu, Zn, and combinations thereof), and combinations thereof. Also, the catalyst layers 212a, 213a may include at least one transition metal selected from the group consisting of: platinum, ruthenium, osmium, platinum-ruthenium alloy, platinum-osmium alloy, platinum-palladium alloy and platinum-M alloy (M is at least one transition metal selected from the group consisting of Ga, Ti, V, Cr, Mn, Fe, Co, Ni, Cu and Zn), which are supported in a carrier. As a carrier, any substance with a suitable conductivity can be used; however, in one embodiment, a carbon carrier is used.

The diffusing layers 212b, 213b are provided to uniformly diffuse fuel, water, air, etc.; to collect the generated electricity; and/or to prevent a loss of the catalyst layers 212a, 213a by fluid. The diffusing layers 212b, 213b can be implemented by a carbon substrate such as a carbon cloth, a carbon paper, etc.

In one embodiment, the microporous layers 212c, 213c include at least one carbon substance selected from the group consisting of graphite, carbon nano tube (CNT), fullerene (C60), active carbon, vulcan, Ketjenblack, carbonblack and carbon nano horn, and may further include at least one binder selected from the group consisting of poly (perfluorosulfone acid), poly (tetrafluoroethylene), fluorinated ethylene-propylene, and combinations thereof.

The separators 215, 215a, 215b function as a conductor to electrically connect an adjacent membrane-electrode assembly in series, and functions as a path to supply fuel and oxidizing agent required for the oxidation reaction and the reduction reaction of the membrane-electrode assembly to the anode electrode and the cathode electrode. The separators 215, 215a, 215b include a mono plate on the side of the anode 215a, a mono plate on the side of the cathode 215b, and at least one bipolar plate 215 between the mono plate on the side of the anode 215a and the mono plate on the side of the cathode 215b. The mono plate on the side of the anode 215a, and the mono plate on the side of the cathode 215b are bonded with the bipolar plate 215.

The gasket 214, the end plate 216 and the engagement mechanisms 217 are for airtightly coupling one or more of the membrane-electrode assemblies with the stack structure of the separators, and can use various suitable materials, and have various suitable shapes and structures.

Figure 6:
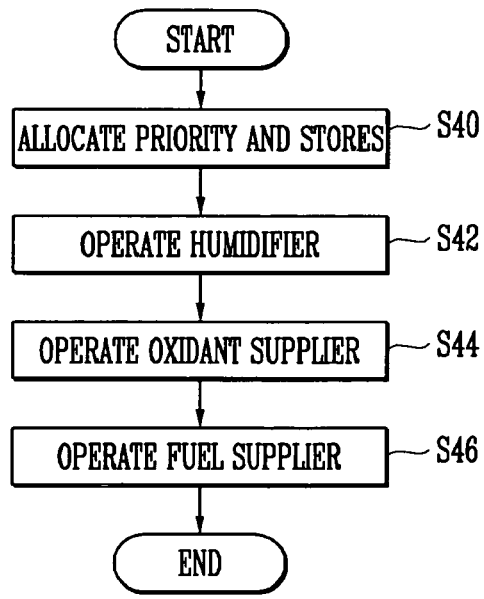
FIG. 6 is a flow diagram showing a method for operating peripheral devices of a fuel cell according to the second embodiment of the present invention.

FIG. 6 is a flow diagram showing a method for operating peripheral devices of a fuel cell system according to the second embodiment of the present invention.

Referring to FIG. 6, the method for operating the peripheral devices of the fuel cell system allocates an operation priority and stores information on the allocated operation priority (S40).

Thereafter, a controller sequentially operates the peripheral devices of the fuel cell system according to the operation priority, in response to the starting request signal for the fuel cell system. A humidifier is then operated first for hydrating the electrolyte membrane (S42). Next, the oxidant supplier is operated (S44). Then, the fuel supplier is operated (S46).

The reason for operating the oxidant supplier prior to the fuel supplier is that in most fuel cell systems, the oxidant supplier for supplying air to the fuel cell, for example, an air pump, is designed to need a greater power capacity (or to consume more electric power) than the fuel supplier for supplying fuel. Therefore, the oxidant supplier is started after hydrating the electrolyte membrane and before the fuel supplier, resulting in that the initial burden of the electricity storage device can be reduced.

As such, in a fuel cell system with which an electricity storage device is coupled according to embodiments of the present invention, lifetime and safety of the electricity storage device are improved by reducing (or minimizing or preventing) unexpected damages and adverse effects which can be generated in the electricity storage device when the system starts.

Also, in an aforementioned embodiment, it has been explained that the power capacity of the electricity storage device is smaller than the power capacity that can sustain (or meet) the instant peak load at the time of starting all of the peripheral devices of the fuel cell. However, in one embodiment, the capacity of the electricity storage device of the present invention can be implemented as being smaller than the capacity needed to sustain (or meet) an instant peak load when at least two or more of the peripheral devices are started concurrently.

As described above, according to the present invention, a fuel cell system reduces (minimizes or prevents) unexpected damage and adverse effects which can be generated in an electricity storage device for supplying starting electric power to peripheral devices of a fuel cell when the fuel cell system starts, resulting in that the lifetime and safety of the electricity storage device can be extended. In addition, reliability of the fuel cell system using the electricity storage device can be improved.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A fuel cell system comprising:
a plurality of peripheral devices comprising:
an oxidant supplier for supplying an oxidizing agent to a fuel cell for generating electricity through an electrochemical reaction between a mixed fuel and the oxidizing agent,
a fuel supplier for supplying a high concentration fuel to a mixing tank for storing water and un-reacted fuel recovered from a fluid exhausted from the fuel cell,
a water supplier for supplying water to the mixing tank, and
a fuel feeder for feeding the mixed fuel stored in the mixing tank to the fuel cell;
an electricity storage device electrically connected with the peripheral devices; and
a controller configured to obtain a signal to sense a concentration of the mixed fuel and to obtain a signal to sense a level of the mixed fuel through a level sensor coupled to the mixing tank in response to an inputted starting request signal and programmed to sequentially operate the peripheral devices by using electric energy stored in the electricity storage device according to an operation priority,
wherein the controller is programmed to sequentially operate the oxidant supplier, the fuel feeder, and the fuel supplier in order when the concentration is within a reference concentration range,
wherein the controller is programmed to sequentially operate the fuel supplier, the oxidant supplier, and the fuel feeder in order when the concentration is below the reference concentration range, and
wherein the controller is programmed to sequentially operate the water supplier first when the sensed level of the mixed fuel is below a reference level.

2. The fuel cell system according to claim 1, wherein the electricity storage device has a power discharge rate smaller than a power discharge rate capable of sustaining an instant peak load generated when all of the peripheral devices of the fuel cell are concurrently started.

3. The fuel cell system according to claim 1, wherein the peripheral devices further comprise a heat exchanger for recovering heat from the fluid exhausted from the fuel cell and for condensing the un-reacted fuel and water, and wherein the controller is configured to further operate the heat exchanger when the sensed level of the mixed fuel is below the reference level.

4. The fuel cell system according to claim 1, further comprising a switching portion for electrically connecting the electricity storage device with the peripheral devices, and wherein the switching portion is controlled by the controller.

5. The fuel cell system according to claim 4, wherein the controller comprises a program stored in a memory and a processor for running the program coupled to the memory, wherein the operation priority is also stored in the memory, and wherein the processor controls the switching portion according to the operation priority stored in the memory in response to the inputted starting request signal.

6. A fuel cell system comprising:
a peripheral system comprising a fuel supplier for supplying a fuel to a fuel cell for generating electricity through an electrochemical reaction between the fuel and an oxidizing agent, an oxidant supplier for supplying the oxidizing agent to the fuel cell, and a humidifier for hydrating an electrolyte membrane in the fuel cell;

an electricity storage device for supplying electric energy to the peripheral system and having a power capacity smaller than a power capacity capable of sustaining an instant peak load generated when the entire peripheral system starts; and a controller programmed to start the peripheral system by using electric energy stored in the electricity storage device according to an operation priority, wherein the controller sequentially operates the humidifier to hydrate the electrolyte membrane, the oxidant supplier, and the fuel supplier in order at a time interval in response to an inputted starting request signal.

7. The fuel cell system according to claim 6, wherein the fuel comprises a hydrogen gas or a gas fuel including the hydrogen gas as a main component.

8. A method for controlling a plurality of peripheral devices for supplying a fuel and an oxidizing agent to a fuel cell and for providing an environment suitable for operating the fuel cell, the method comprising:

allocating an operation priority to the peripheral devices, wherein the peripheral devices comprise an oxidant supplier for supplying the oxidizing agent to the fuel cell, a fuel feeder for feeding a fuel mixture of the fuel and water into the fuel cell, a fuel supplier for supplying a high concentration fuel to a mixing tank storing the fuel mixture, and a water supplier for supplying water to the mixing tank;

storing information of the operation priority;

sensing a concentration of the fuel mixture as the sensed fuel concentration and sensing a level of the fuel mixture as the sensed fuel level in response to an inputted starting request signal; and sequentially operating the peripheral devices by using electric energy stored in a small capacity electricity storage device according to the operation priority, wherein the operation priority is assigned according to the sensed fuel concentration, and the oxidant supplier, the fuel feeder, and the fuel supplier are sequentially operated in order at a time interval when the sensed concentration of the mixed fuel is within a reference concentration range, wherein the fuel supplier, the oxidant supplier, and the fuel feeder are sequentially operated in order at a time interval when the sensed concentration of the mixed fuel is below the reference concentration range, and wherein the water supplier is operated first when the level of the fuel mixture is below a reference level.

9. The method according to claim 8, wherein the small capacity electricity storage device comprises at least one of a battery or a super capacitor, and the small capacity electricity storage device is an electricity storage device having a power discharge rate smaller than a power discharge rate capable of sustaining an instant peak load when all of the peripheral devices are concurrently started.

10. The method according to claim 8, further comprising operating a heat exchanger for recovering heat energy of a fluid exhausted from the fuel cell when a level of the fuel mixture is below a reference level.

11. The method according to claim 8, wherein the fuel cell comprises a direct methanol fuel cell for directly using a liquid fuel including hydrogen.

12. A method for controlling a plurality of peripheral devices for supplying a fuel and an oxidizing agent to a fuel cell and for providing an environment suitable for operating the fuel cell, the method comprising:

allocating an operation priority to the peripheral devices, wherein the peripheral devices comprise a humidifier for hydrating an electrolyte membrane in the fuel cell, a fuel supplier for supplying the fuel to the fuel cell, and an oxidant supplier for supplying the oxidizing agent to the fuel cell;

storing information of the operation priority; and sequentially operating the humidifier to humidify the electrolyte membrane, the oxidant supplier, and the fuel supplier in order at a time interval in response to an inputted starting request signal, wherein the peripheral devices are operated by using electric energy stored in a small capacity electricity storage device according to the operation priority.

13. The method according to claim 12, wherein the fuel cell comprises a polymer electrolyte membrane fuel cell for using a hydrogen gas or a gas fuel including the hydrogen gas as a main component.

* * * * *